Oct. 14, 1930. A. C. BOWERS ET AL 1,778,307
APPARATUS FOR THE MANUFACTURE OF LAMINATED RUBBER SHEETING
Filed July 8, 1927  3 Sheets-Sheet 1
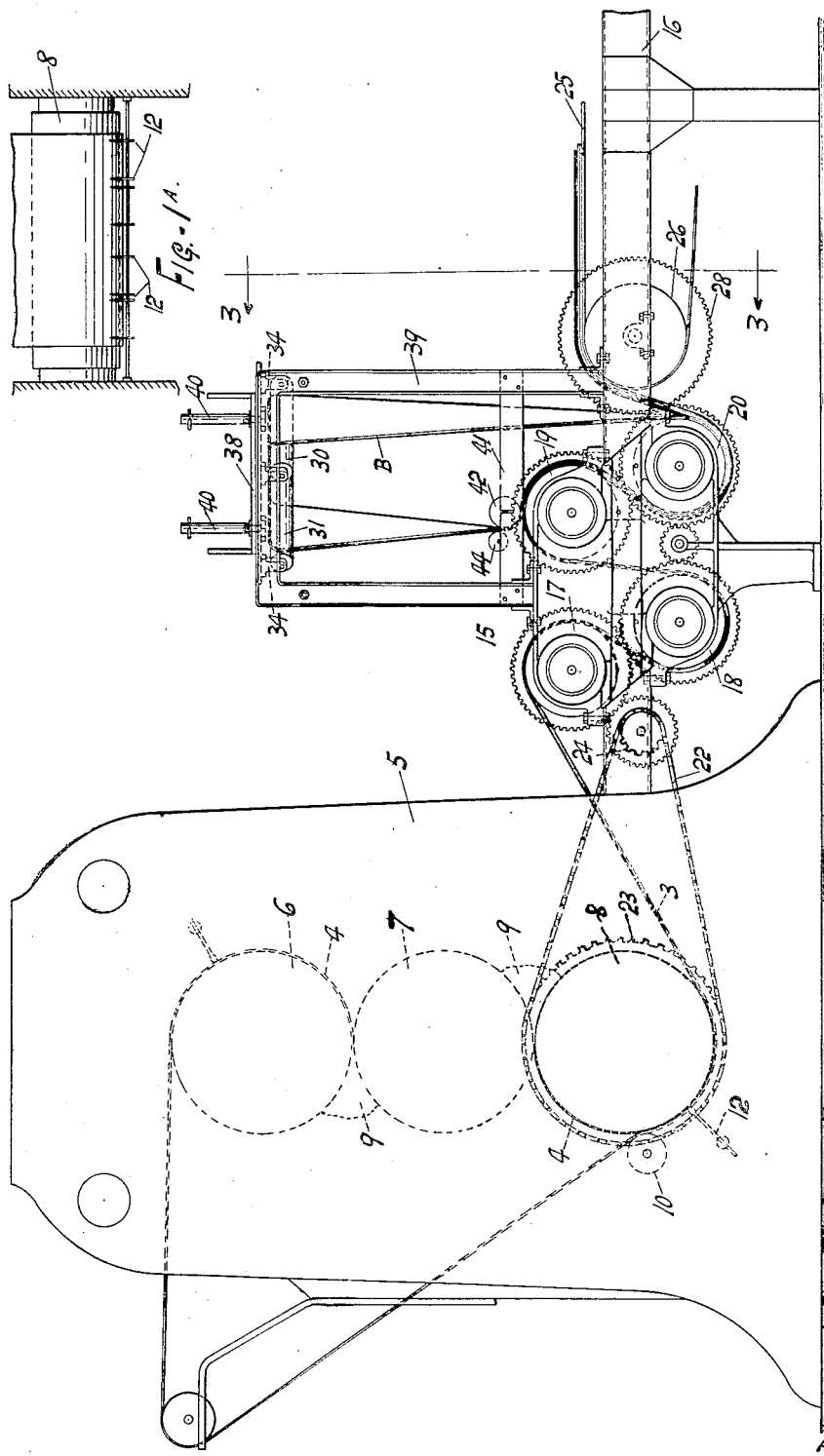

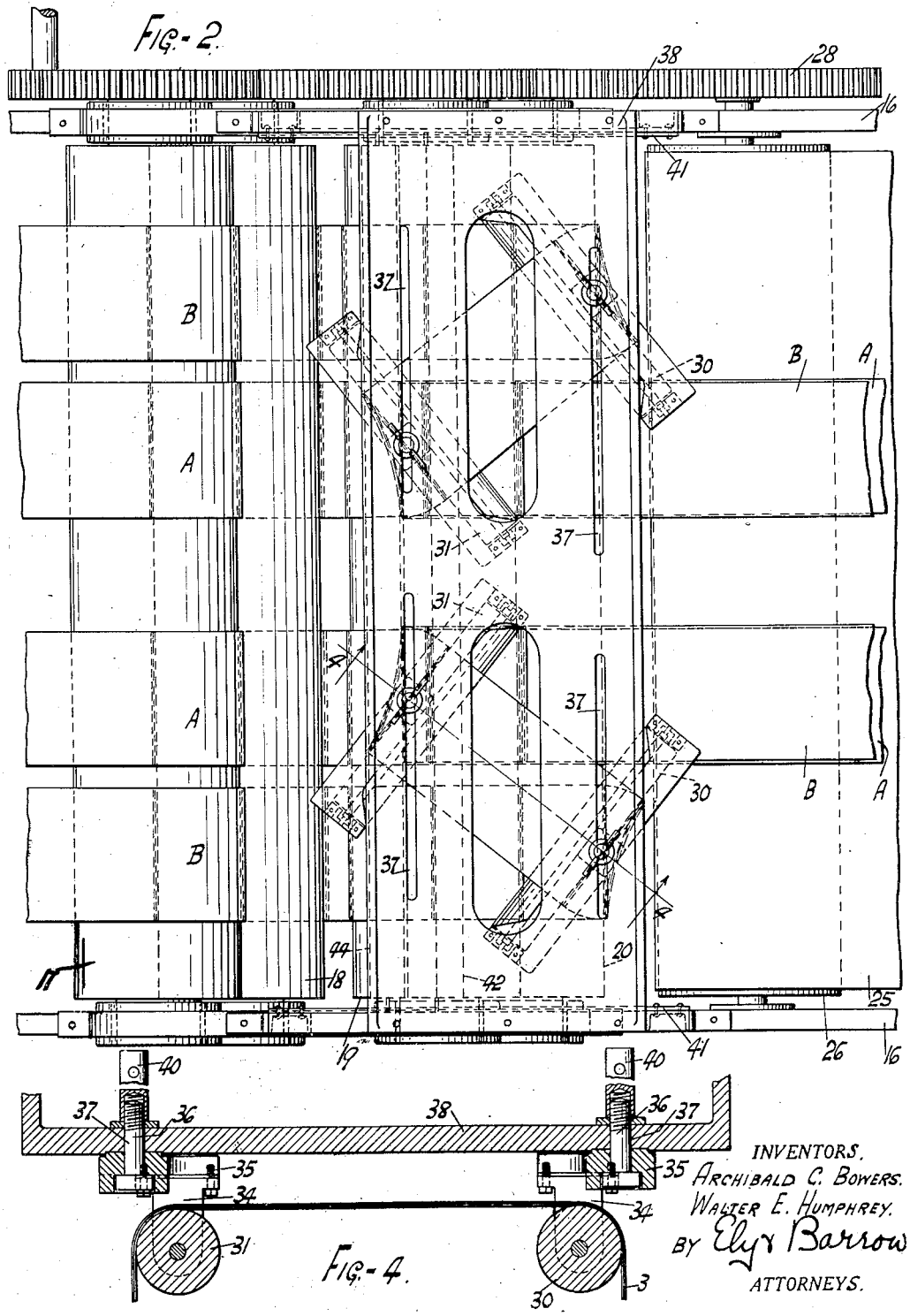

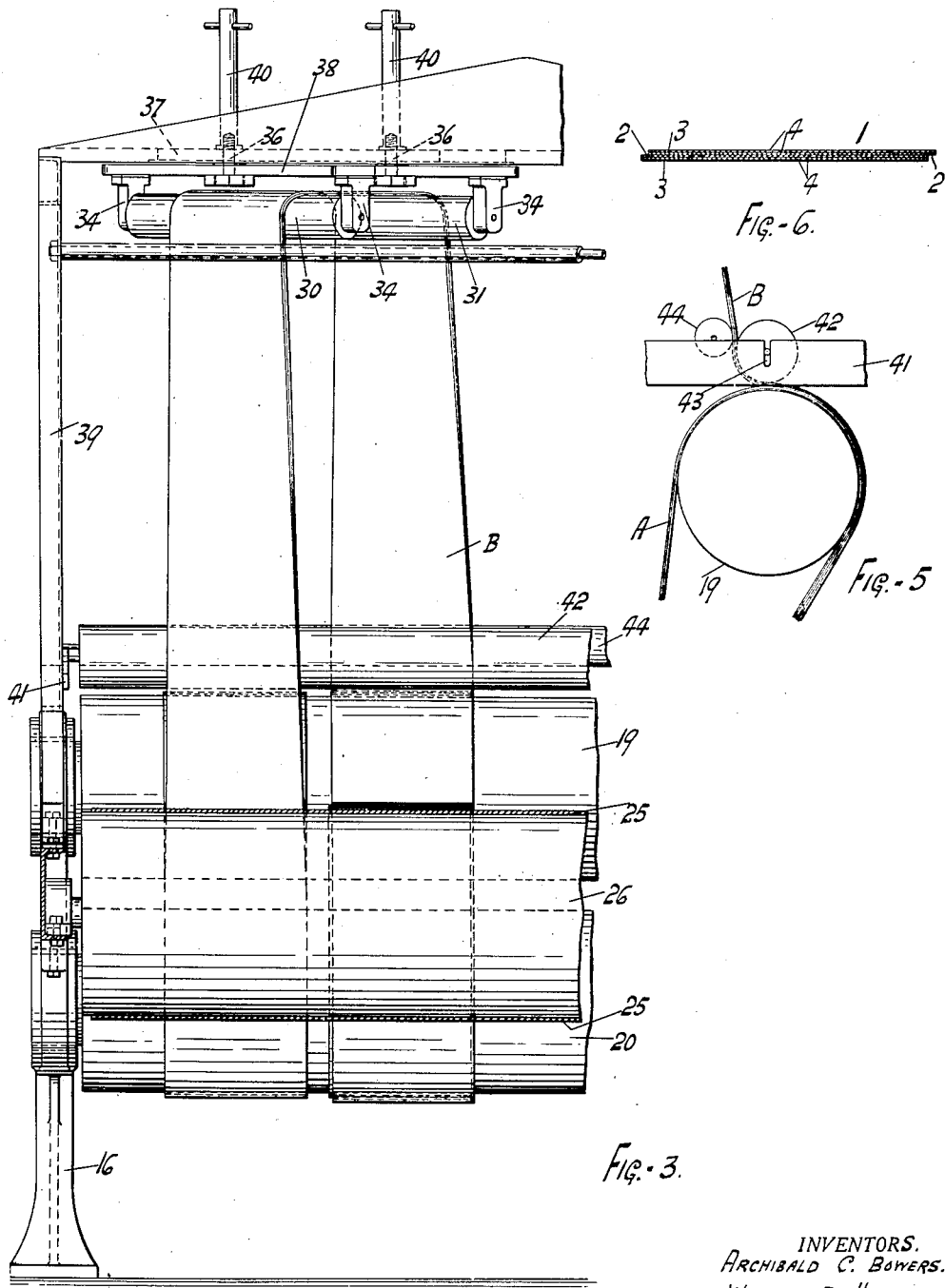

Patented Oct. 14, 1930

1,778,307

UNITED STATES PATENT OFFICE

ARCHIBALD C. BOWERS AND WALTER E. HUMPHREY, OF KENT, OHIO, ASSIGNORS, BY MESNE ASSIGNMENTS, TO NATIONAL RUBBER MACHINERY COMPANY, OF AKRON, OHIO, A CORPORATION OF OHIO

APPARATUS FOR THE MANUFACTURE OF LAMINATED RUBBER SHEETING

Application filed July 8, 1927. Serial No. 204,277.

This invention relates to the manufacture of laminated rubber sheeting or stock as a direct adjunct to the calendering operation. It is particularly intended for the manufacture of rubber in sheet form for the subsequent manufacture of tubes for pneumatic tires. It is particularly adapted in certain of its features for the fabrication of tubes by the full molded process, being designed and intended for securing certain advantageous results as will be explained herein.

In the manufacture of tubes by the full molded process it is the general practice to cut a sheet of laminated tube stock of length equal to the circumference of the green or unvulcanized tube and to form the length so obtained into a band. The edges of the band are then brought together and spliced, making a seam or splice around the tube. It has heretofore been a practice to lap the edges of the sheet which however, forms an objectionable double thickness of tube stock about the splice. It has also been a practice in the manufacture of tube stock to superimpose a narrow ply upon a somewhat wider ply. This process however, can only be used to make a two-ply stock in conjunction with the so-called pole method of tube manufacture, in which the two plies are wrapped twice about the pole to obtain the requisite number of laminations required to make a satisfactory tube.

By means of the process and apparatus shown and described herein, the manufacturer is enabled to construct a laminated sheet or strip of rubber in which the plies are of the same width and stepped off from one another so that the tube can be constructed from an endless band of the stock by a butt joint, or if the edges of the stock are superimposed, the seam will be of the same thickness as the balance of the tube, and it is possible to manufacture the sheet of the four plies required by standard requirements.

The advantages of the present method and apparatus reside in the economy of operation which is obtainable, it being possible to run the stock continuously and directly from the calender, the stepped off plies being united or laminated directly from the calender. It would be inadvisable to attempt to step off the plies upon the calender for the reason that the projecting portions of the plies would adhere to the adjacent stock on the calender roll, so that the assembling or plying up operation takes place at a point spaced from the calender rolls.

The plied up and stepped off stock can be run very rapidly and very efficiently from the calender and is ready for the tube building operation without rerolling or rehandling, except for the operation of cutting the strips to the proper length. The strips can then be taken directly to the building drums where the tubes are formed into the band and then into the tube in the manner described, whereupon they are ready for immediate placement within the vulcanizers or molds.

The description and drawings accompanying the application are quite detailed and represent an existing installation which has been used successfully in the manufacture of stock for the fabrication of full molded tubes. It will be apparent, however, that having made known the principles of the invention, others skilled in the art may utilize the same in other or different embodiments, without departure from the essential features of the invention as set forth in the claim. It is, therefore, to be understood that the claims are intended to cover the invention as broadly as possible in view of their terms and the limitations of the prior art. It will also be understood that the invention is not limited to this adaptation for the full molded tube process but may be used in the manufacture of tubes by other methods, in fact, for the manufacture of all rubber articles.

In the drawings:

Figure 1 is a general side elevation of the complete apparatus for the continuous manufacture of two strips of tube stock of four-ply stepped-off construction;

Figure 1ᵃ is a diagram of the lower calender roll showing the points at which the stock is cut;

Figure 2 is a plan view taken over the point of assembly;

Figure 3 is a section on the line 3—3 of Figure 1;
Figure 4 is a section on the line 4—4 of Figure 2;
Figure 5 is a detailed cross section at the assembly point; and
Figure 6 is a cross section of a laminated four-ply sheet made in the apparatus illustrated.

The machine as set up is designed for the manufacture of four-ply laminated tube stock 1 with a single step-off 2 on both edges of the sheet of material, the layers 3 each composed of two plies 4 being of the same width.

The apparatus comprises a calender of any preferred type, here illustrated as the usual 3-roll calender 5, the rollers being designated at 6, 7 and 8, and adapted to form a sheet of rubber of determined thickness from banks of rubber 9 as usual. It will be observed that one of the plies 4 issues from between the rollers 6 and 7, while another ply 4 issues from between the rollers 7 and 8, the two plies being laminated on the roller 8 to form a layer 3 by means of the pressure roller 10. It will be observed that if layers of single plies are to be formed, either of the banks may be omitted and the calender adjusted for this purpose in any approved manner.

The layer of rubber is cut by a plurality of knives 12 bearing upon the roll 8 at any point, the knives being adjustable along the surface of the roll so as to obtain any desired width or location of the layers, the location of the knives also giving the amount of step-off between the layers.

The assembly of the layers is preferred at a point removed from the calender, being accomplished upon an assembling unit indicated generally at 15. This unit comprises a frame work 16 situated near the calender in which are mounted a plurality of cooling rolls here shown as four in number, and indicated by the reference characters 17, 18, 19 and 20, driven by intermeshing gearing at slightly greater surface speed than the calender roll 8, being connected to and driven from the latter by a chain 22 passing over a sprocket 23 on the roller 8 and over a driving sprocket 24 on the rolls. The frame also supports an off-carrying belt 25 trained over a pulley 26 adjacent the last of the cooling rollers and driven at the same surface speed by a gear 28.

The several layers pass in parallelism from the calender over the cooling rolls in succession. These layers are in pairs A and B, side by side, and one layers A of each pair passes directly over the cooling rolls on to the carrying-off belt. The other layer B of each pair, however, as it leaves the roller 20 is altered in its course being brought upwardly and threaded over an idler pulley 30, around a second idler pulley 31 and downwardly to a position over its companion layer. In order to obtain the cross-over for this ply, the rollers 30 and 31 are arranged in parallelism, but at an angle to the line of travel of the layers, so that the layer B crosses over and is delivered in a position over the layer A. The varying widths of stock required for different size tubes and the off-setting of the several laminations require different angular adjustments and positions for the rollers 30 and 31 and for accomplishing this purpose the rollers are each supported in bearings 34 suspended from brackets 35 which are angularly adjustable about pins 36 mounted in transverse slots 37 on an elevated platform 38 which is mounted on the assembly support 39. The brackets 35 are drawn toward the underside of the platform by nuts 40 engaging the upper ends of the pins 36.

By the cross-over device or assembly, the layer B is given a partial turn or twist, is then conducted to a point over the layer A and is then given a reverse twist so that it will be conducted to an off-set position upon the layer A.

The actual assembly of the final strip occurs upon the surface of the roller 19, the layer B being conducted to the surface of the layer A beneath a floating pressure roller 42, the shaft of which rides in deep notches 43 in the cross pieces 41. A floating roller 44 bears against the layer B as it contacts with the roller 42 so as to flatten the layer against the roller. The roller rests with its shaft on the upper cross pieces 41, the direction of rotation insuring a constant bearing against the roller 42. The several rollers may be covered with canvas, or other surfacing may be used.

The operation of the process and apparatus will have been apparent from the description which has been given. It will be noted that it is possible to obtain a very rapid and efficient production of sheets or strips of plied rubber sheeting having stepped-off edges suitable particularly for the purposes specified.

What is claimed is:

1. An apparatus for the manufacture of rubber sheeting in a plurality of layers comprising the combination of a calender for simultaneously forming a plurality of strips of rubber sheeting, and an assembly device removed from the calender comprising means for conducting one of said strips in a helical loop to a position over another strip, and uniting the strips in superimposed relation, with the edges of one strip offset with respect to the edges of the other strip.

2. An apparatus for the manufacture of rubber sheeting comprising means for forming strips of rubber continuously, means for converging said strips to superimpose them with the edges of one strip offset with respect to the edges of the other strip said means comprising rolls adapted to turn one strip in a helical loop into the plane of an untwisted strip, and means for uniting the strips in superimposed relation while in strip form to obtain continuous production of a laminated rubber sheet.

3. An apparatus for the manufacture of rubber sheeting in strip form comprising a calender; means for cutting a plurality of strips from the calender, means for conducting the strips in parallel relationship in the direction in which they issue from the calender, guide rollers over which one of said strips is conducted in a spiral loop to bring it to a position over the other strip which continues in said direction, and means for uniting the strips to form a compound laminated rubber sheet.

4. An apparatus for the manufacture of rubber sheeting in strip form comprising a calender, means for cutting a plurality of strips from the calender, means for conducting the strips in parallel relationship in the direction in which they issue from the calender, guide rollers over which one of said strips is conducted in a helical loop to bring it to a position over the other strip which continues in said direction, said guide rollers being arranged obliquely to the line of travel of the strips, and means for uniting the strips to form a compound laminated rubber sheet.

5. An apparatus for the manufacture of rubber sheeting in strip form comprising a calender, knives upon the calender for cutting two strips from the sheet of rubber formed thereon, means for conducting the strips from the calender in the direction in which they issue therefrom, and guide rollers over which one of the strips is passed, said guide rollers being positioned to turn said strip in a helical loop to superimpose said strip on the other of said strips.

6. An apparatus for the manufacture of rubber sheeting in strip form comprising a calender, knives upon the calender for cutting two strips from the sheet of rubber formed thereon, means for conducting the strips from the calender in the direction in which they issue therefrom, and guide rollers over which one of the strips is passed, said guide rollers altering the course of the strip until the strips are superimposed offset from one another and continue as a composite strip in said direction.

7. In an apparatus for the manufacture of rubber sheeting in strip form, the combination of a calender for the making of a two-ply layer of rubber, means for cutting parallel strips from the two-ply layer, means for cooling the strips, and guide rollers over which one of the strips is led in a helical loop to converge in upside down relation with the other strip, the edges of the strips being offset with respect to one another.

8. In an apparatus for the manufacture of rubber sheeting in strip form, the combination of a calender for the making of a two-ply layer of rubber, means for cutting parallel strips from the two-ply layer, and guide rollers over which one of the strips is led in a helical path terminating within the boundaries of the other strip passing along in the direction in which it issues from the calender, the edges of the strips being offset with respect to one another.

9. In an apparatus for the manufacture of rubber sheeting in strip form, the combination of a calender for the making of a layer of rubber, means for cutting parallel strips from the layer, means for cooling the strips, and guide rollers over which one of the strips is led in a helical path to bring the strip in upside down relation within the boundaries of the other strip, said helical path imparting the least possible twist to the superimposed strip.

10. In an apparatus for the manufacture of rubber sheeting in strip form, the combination of a calender for the making of a layer of rubber, means for cutting parallel strips from the layer, and guide rollers over which one of the strips is led in a helical loop terminating within the boundaries of the other strip passing along in the direction in which it issues from the calender, the edges of the strips being offset with respect to one another.

11. In combination, means for forming parallel strips of material in the same plane, means for moving certain of said strips in untwisted paths, means for moving certain other of said strips in untwisted helical loops to superimpose said last named strips in upside down relation on said first named strips.

12. In combination with parallel strips of material lying in the same plane, means for moving certain of said strips in untwisted paths, means for moving certain other of said strips in untwisted helical loops to superimpose said last named strips on said first named strips.

13. In combination, means for forming parallel strips of material in the same plane, means for moving certain of said strips in untwisted paths, means for moving certain other of said strips in untwisted helical loops to superimpose said last named strips on said first named strips.

ARCHIBALD C. BOWERS.
WALTER E. HUMPHREY.